United States Patent
Fair et al.

(10) Patent No.: US 10,086,514 B2
(45) Date of Patent: Oct. 2, 2018

(54) ROBOTIC SYSTEM AND METHOD FOR PROCESSING AIRCRAFT COMPONENT

(71) Applicant: Textron Innovations Inc., Providence, RI (US)

(72) Inventors: Darren Fair, Newton, KS (US); Austin Garbers, San Jose, CA (US)

(73) Assignee: Textron Innovations, Inc., Providence, RI (US)

( * ) Notice: Subject to any disclaimer, the term of this patent is extended or adjusted under 35 U.S.C. 154(b) by 216 days.

(21) Appl. No.: 15/166,447

(22) Filed: May 27, 2016

(65) Prior Publication Data

US 2016/0349730 A1 Dec. 1, 2016

Related U.S. Application Data

(60) Provisional application No. 62/168,150, filed on May 29, 2015.

(51) Int. Cl.
  *G05B 19/402* (2006.01)
  *B25J 9/16* (2006.01)

(52) U.S. Cl.
  CPC .......... *B25J 9/1687* (2013.01); *B25J 9/1612* (2013.01); *B25J 9/1697* (2013.01);
  (Continued)

(58) Field of Classification Search
  CPC ...... B25J 9/1687; B25J 9/1697; B25J 9/1612; G05B 2219/31068; Y10S 901/47; Y10S 901/31; Y10S 901/09
  See application file for complete search history.

(56) References Cited

U.S. PATENT DOCUMENTS 6,314,631 B1 * 11/2001 Pryor ................... A01B 69/008
  29/407.04
7,395,606 B2 * 7/2008 Crampton ............ B25J 13/088
  33/503
(Continued)

FOREIGN PATENT DOCUMENTS

BR PI1005196-1 A2 12/2010
CA 2722894 A1 6/2011
(Continued)

*Primary Examiner* — Charles Kasenge
(74) *Attorney, Agent, or Firm* — Erise IP, P.A.

(57) ABSTRACT

Embodiments of the present disclosure include a robotic method for processing an aircraft component that includes determining feature positions by illuminating with light, imaging the reflected light with a camera, and processing images from the camera. The method further includes determining a position offset of the features by comparing to a model of the aircraft component, determining a path offset for movement by a robot arm, and modifying the aircraft component using a processing tool coupled to the robot arm. A robotic system for processing an aircraft component includes a light emitting device and a camera configured for respectively illuminating and imaging features of an aircraft component, a gripper tool for gripping and moving the aircraft component to a workstation, a processing tool for modifying the aircraft component, and a controller to control the light emitting device, camera, gripper tool, workstation, and processing tool to modify the aircraft component.

14 Claims, 8 Drawing Sheets

(52) U.S. Cl.
CPC ... *G05B 2219/31068* (2013.01); *Y10S 901/09* (2013.01); *Y10S 901/31* (2013.01); *Y10S 901/47* (2013.01)

(56) References Cited

U.S. PATENT DOCUMENTS

| | | | |
|---|---|---|---|
| 7,882,394 B2* | 2/2011 | Hosek | G05B 23/0235 |
| | | | 702/184 |
| 8,290,624 B2* | 10/2012 | Hjornet | B25J 15/0616 |
| | | | 414/737 |
| 8,356,207 B2* | 1/2013 | Hosek | G05B 23/0235 |
| | | | 702/184 |
| 8,634,950 B2 | 1/2014 | Simonetti et al. | |
| 9,104,650 B2* | 8/2015 | Hosek | G06F 11/2257 |
| 2005/0166413 A1* | 8/2005 | Crampton | B25J 13/088 |
| | | | 33/503 |
| 2008/0235970 A1* | 10/2008 | Crampton | B25J 13/088 |
| | | | 33/503 |
| 2010/0135760 A1* | 6/2010 | Hjornet | B25J 15/0616 |
| | | | 414/744.8 |
| 2013/0034420 A1* | 2/2013 | Hjornet | B25J 15/0616 |
| | | | 414/752.1 |

FOREIGN PATENT DOCUMENTS

| | | | |
|---|---|---|---|
| CN | 102294589 A | 12/2011 | |
| EP | 2333626 A2 | 6/2011 | |
| EP | 2730985 A1 | 5/2014 | |
| JP | 2011136416 A | 7/2011 | |

\* cited by examiner

ROBOTIC SYSTEM AND METHOD FOR PROCESSING AIRCRAFT COMPONENT

CROSS-REFERENCE TO RELATED APPLICATIONS

This application claims priority to U.S. Provisional Application Ser. No. 62/168,150, entitled "Methods for Robotically Processing an Aircraft Component", and filed May 29, 2015. The aforementioned application is incorporated by reference in its entirety.

BACKGROUND OF THE INVENTION

1. Field of the Invention

The invention relates generally to the field of aircraft assembly. More specifically, the invention relates to the field of robotic processes for automating aircraft assembly procedures.

2. Description of the Related Art

Robotics have long been used in the manufacturing process of a variety of products. It is also known to use metrological techniques to measure physical characteristics of the part during production, so that a robotic system can orient a part so that that part can be processed in some way.

One example of such an arrangement is discussed in U.S. Pat. No. 8,634,950 issued to Simonetti et al. Simonetti discloses a technique wherein a portion of an aircraft fuselage is lined up with an adjacent fuselage section. The original portion is loaded on a support or dolly that is attached to the robotic arm, then metrology techniques (e.g., using optical sensors) are used to create a geometric model, and a center point for the part is determined using the model. The model center point is then conformed to the robot tool center point, and this is used to match up the two fuselage sections so that they are in alignment and will fit together properly.

SUMMARY

In an embodiment, a robotic method for processing an aircraft component is provided. The method includes illuminating a feature of the aircraft component with a light emitting device which is mechanically coupled to a robot; receiving light reflected from the feature on the aircraft component to capture at least one image using a camera configured for receiving the light, the camera being mechanically coupled to the robot; processing the at least one image to determine an actual feature position; comparing the actual feature position with an expected feature position based on a model of the aircraft component to determine a feature position offset; repeating the steps of illuminating the feature, receiving light, processing the at least one image, and comparing the actual feature position with the expected feature position for a plurality of features to determine a plurality of feature position offsets; determining a path offset based on the plurality of feature position offsets and a modeled path based on the model of the aircraft component; robotically gripping the aircraft component with a gripper tool; and, moving the component in a manner accounting for the path offset.

In another embodiment, a robotic method for processing an aircraft component is provided. The method includes determining a position of a plurality of features of the aircraft component by illuminating the aircraft component with a laser mechanically coupled to a robot arm, imaging the reflected laser light with a camera mechanically coupled to the robot arm, and processing images from the camera; determining a position offset for the plurality of features by comparing the position of the plurality of features to a model of the aircraft component; determining a path offset for movement by the robot arm based on the position offset and the model of the aircraft component; and, modifying the aircraft component, based on the path offset, using a first processing tool coupled to the robot arm to make a first modification.

In yet another embodiment, a robotic system for processing an aircraft component is provided. The system includes a light emitting device and a camera configured for respectively illuminating and receiving a plurality of images of features of the aircraft component; a gripper tool for gripping and moving the aircraft component to a workstation based on the plurality of images received using the camera; a processing tool configured for modifying the aircraft component secured to the workstation based on the plurality of images received; and, a controller configured to robotically control the light emitting device, the camera, the gripper tool, the workstation, and the processing tool to make at least one modification to the aircraft component based on a position offset for features of the aircraft component, the controller comparing the position offset against a model of the aircraft component, and configured to move the robot arm based on the position offset.

DETAILED DESCRIPTION

Embodiments of the present invention provide a robotic system and methods for processing an aircraft component, including a system and methods to locate features of the aircraft component, grab the aircraft component based on the features, move the aircraft component to a work station, and process the aircraft component based on the features. Advantages provided by these embodiments include improved accuracy, improved productivity, reduced opportunities for injury and human error, and mitigation of ergonomically unfriendly positions.

Figure 1:
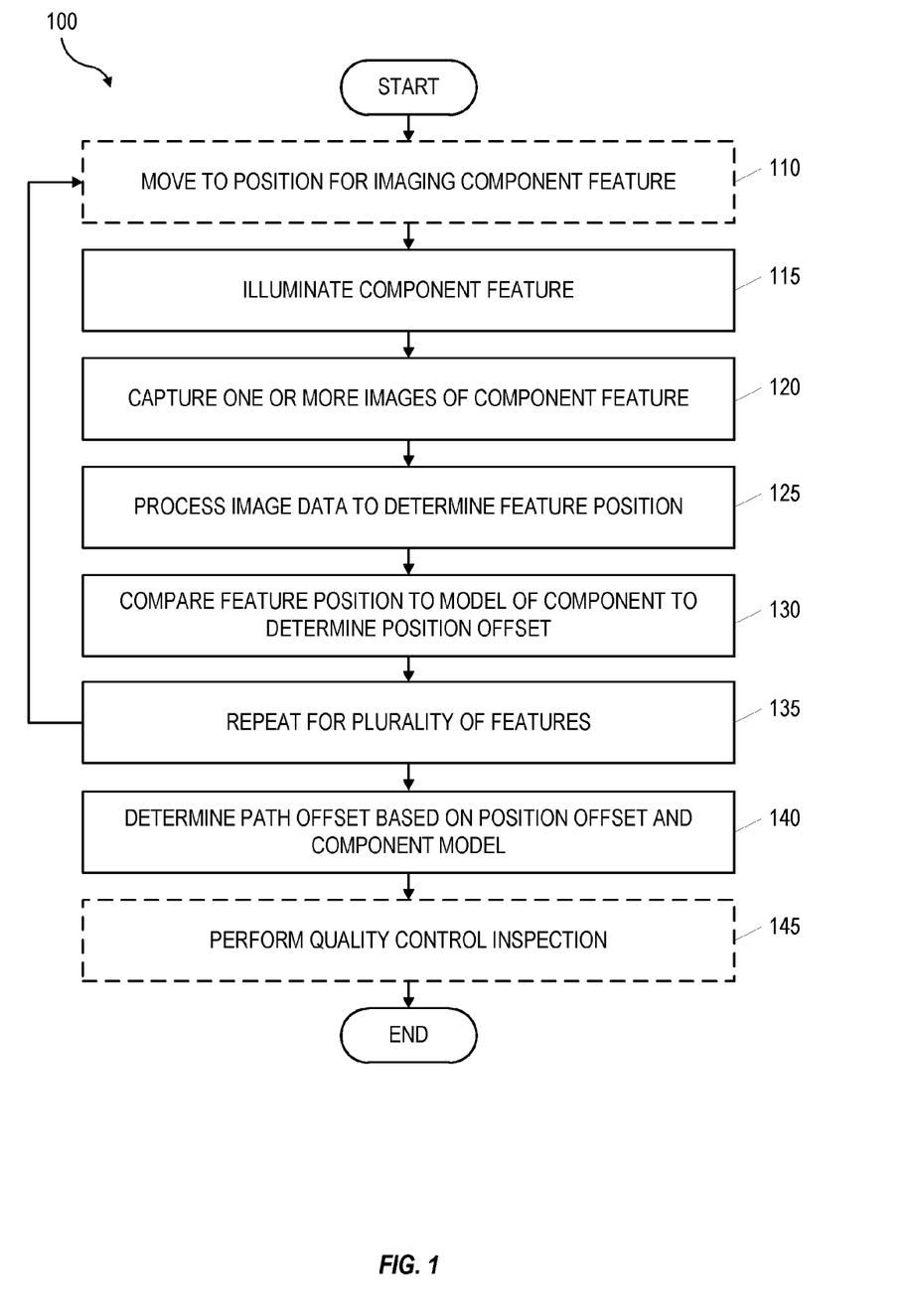
FIG. 1 shows steps of a robotic method for processing an aircraft component, in an embodiment.

FIG. 1 shows steps of an exemplary robotic method 100 for processing an aircraft component. Specifically, method 100 includes steps for locating features of an aircraft component, such as an aft pressure bulkhead for example, but method 100 may be used with any aircraft component that requires processing without departing from the scope hereof. Steps of FIG. 1 are described below in conjunction with FIG. 2.

Figure 2:
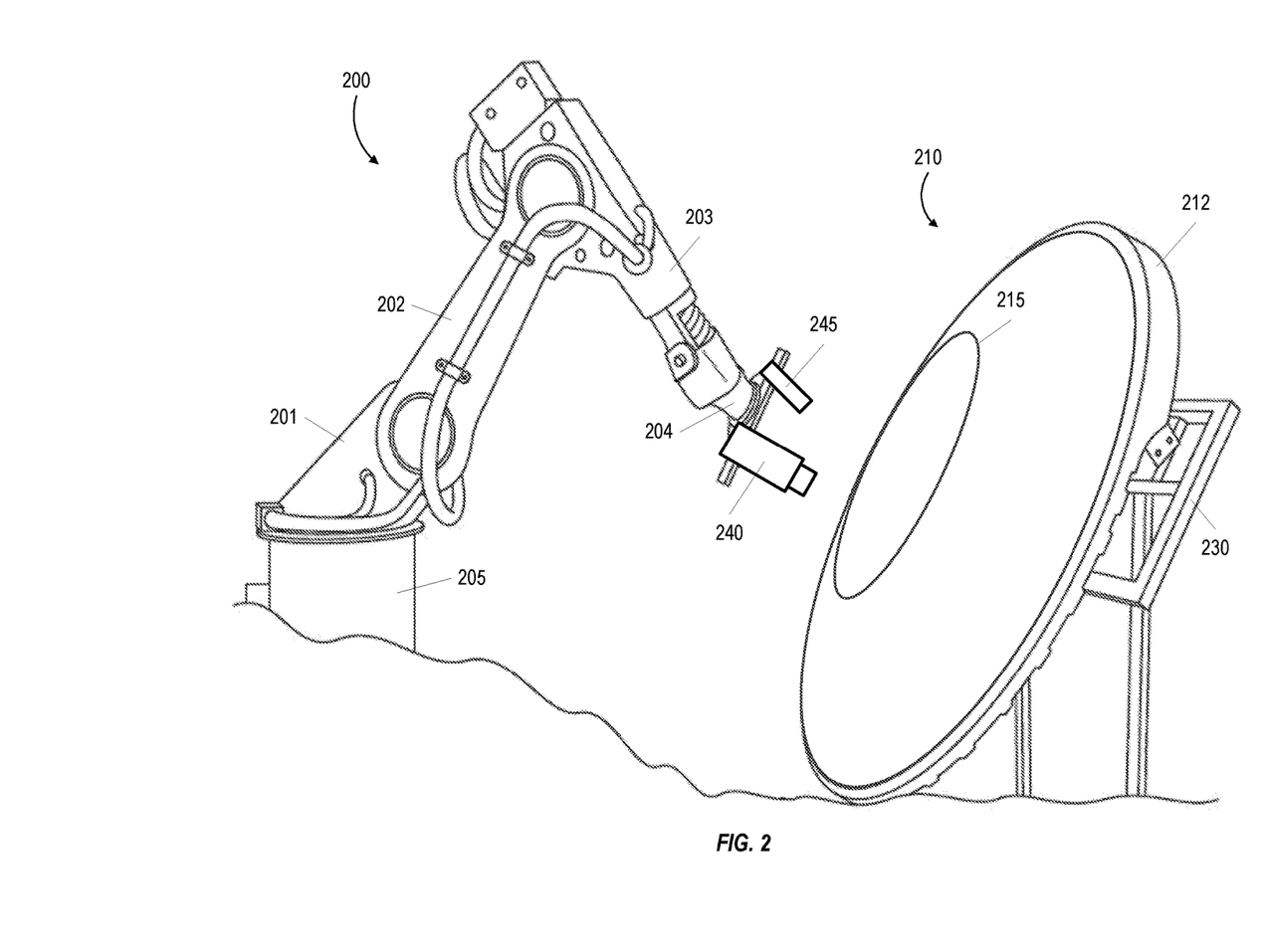
FIG. 2 shows a robot configured to perform the robotic method of FIG. 1, in an embodiment.

FIG. 2 shows a robot 200 configured to perform robotic method 100, FIG. 1. FIGS. 1 and 2 are best viewed together with the following description. Specifically, FIG. 2 shows robot 200 configured with a camera 240 for imaging an aircraft component 210. Camera 240 is for example a digital camera having a charge-coupled device (CCD) array or complementary metal-oxide-semiconductor (CMOS) imaging sensor. Aircraft component 210 is for example a composite aluminum aft pressure bulkhead. Aircraft component 210 may be mounted to a table 230 that includes a pivotable top for pivoting aircraft component 210 at an adjustable angle as depicted in FIG. 2. Table 230 may include lockable wheels enabling aircraft component 210 to be moved or locked in place.

Robot 200 includes a first arm 201 mechanically coupled to a base 205, a second arm 202 mechanically coupled to first arm 201, and a third arm 203 mechanically coupled to second arm 202. Robot 200 could be, for example, any of a number of robots capable of multiple degrees of freedom in movement. In one embodiment, an industrial robot Model No. KR30HA from Kuka Robotics (Augsburg, Germany) has been used. Those skilled in the art, however, will realize that the scope of this invention should not be limited to any particular robot unless specified in some manner in the claims. Camera 240 may be directly mechanically coupled to third arm 203 or indirectly coupled to third arm 203 via a head 204 for example. Head 204 may be configured to pivot and/or spin to provide camera 240 with desired imaging angles. In addition to camera 240, a light emitting device 245 may be mounted to third arm 204 and configured to illuminate features of aircraft component 210. Light emitting device 245, is a ring light in some embodiments, and a laser line generator configured to produce collimated laser light in other embodiments.

As depicted in FIG. 2, aircraft component 210 includes an outer circumferential edge 212 and a feature 215. Feature 215 is an example of a feature of aircraft component 210, including but not limited to seams, overlapping layers, holes, corners, rivets, etc. In an embodiment, aircraft component 210 is a pre-fabricated composite structure made by, for example, welding, bonding, co-bonding, and/or co-curing which results in surface features such as seams and overlapping layers. The location of the surface features may vary from part to part due to manufacturing tolerances and tolerance stack-up for example, requiring precise location of features, such as feature 215, to be determined prior to processing of aircraft component 210.

Robot 200 is configured to illuminate features, such as feature 215, of aircraft component 210 using light emitting device 245 and to receive reflected light using camera 240. Based on the received light, feature positions may be determined using for example method 100, FIG. 1. In an embodiment, light emitting device 245 generates collimated laser light in the infrared spectrum and camera 240 includes an infrared filter for receiving infrared light. One advantage of using infrared laser light in combination with an infrared camera filter is improved accuracy for determining feature positions by excluding ambient light, which may be inconsistent depending on ambient lighting conditions. Another advantage of using infrared laser light is improved user safety compared to visible laser light, which may be harmful to eyes for example.

Referring to FIG. 1, after starting, in an optional step 110, the robot moves the camera to a position for imaging the aircraft component. In an example of step 110, robot 200 of FIG. 2 moves camera 240 and light emitting device 245 to a pre-defined position for imaging aircraft component 210. Step 110 is optional because camera 240 may already be in the pre-defined position or the pre-defined position may be a fixed position without departing from the scope hereof.

In a step 115, an aircraft component is illuminated. In an example of step 115, the entirety of aircraft component 210 is illuminated with light emitting device 245 configured as an infrared ring light. In another example of step 115, feature 215 is a seam of aircraft component 210, which is illuminated with infrared laser light via light emitting device 245.

In a step 120, one or more images of an aircraft component feature are captured. In an example of step 120, camera 240 of FIG. 2 captures one or more images of feature 215 from one or more predetermined positions. In an embodiment, camera 240 is equipped with an infrared filter configured for receiving reflected infrared light, as produced by light emitting device 245 in step 115 for example.

In a step 125, the one or more images captured in step 120 are processed and data from the one or more images are used to determine a feature position. In an example of step 125, image data 302 are processed via controller 310, FIG. 3 described below. Specifically, image data 302 received from camera 240 are stored in a memory 320 and then processed using feature position instructions 332 to provide feature position data 305 for feature 215.

Figure 3:
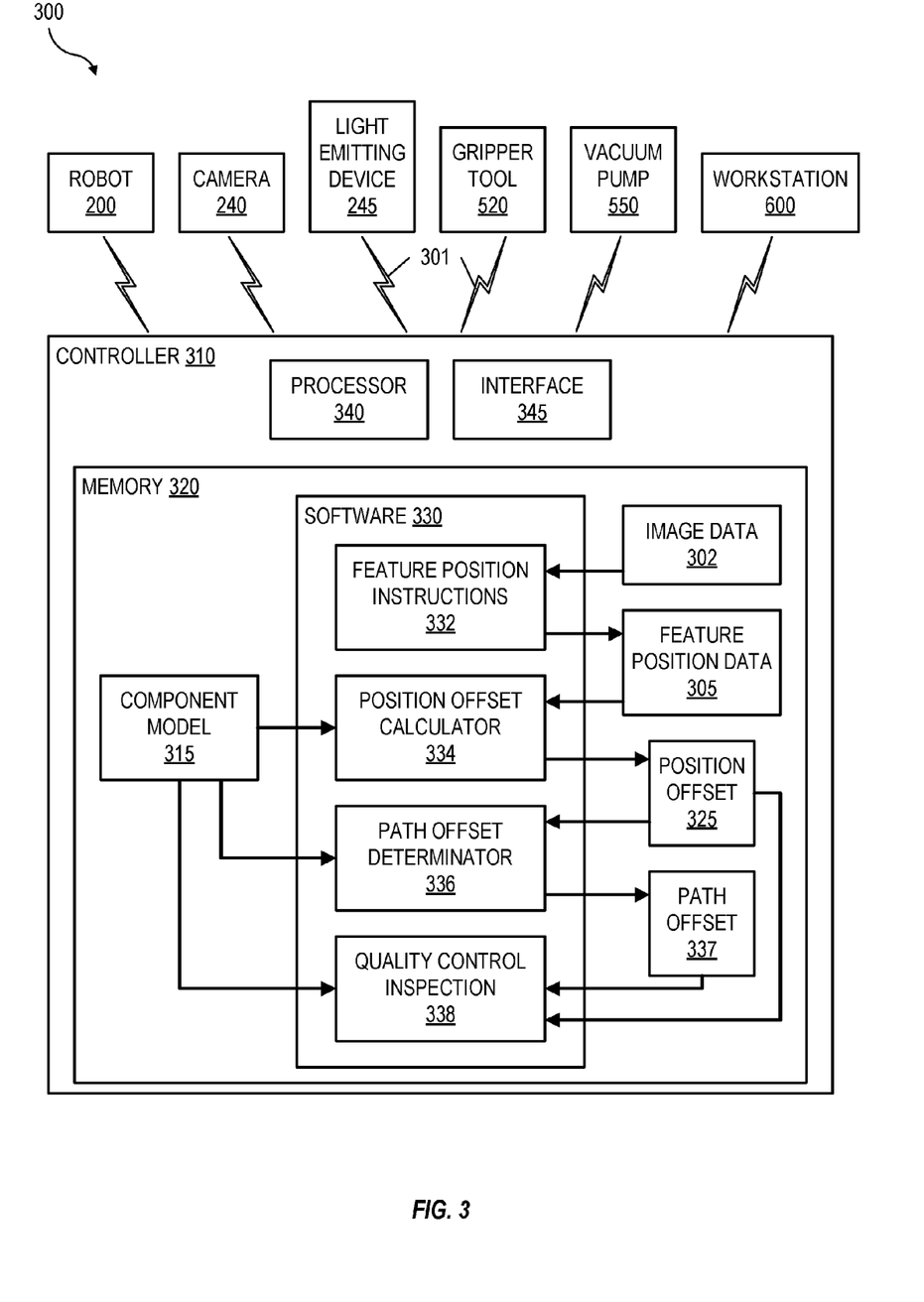
FIG. 3 shows a controller for processing image data for the method of FIG. 1 and for controlling the robot of FIG. 2, in an embodiment.

FIG. 3 shows an exemplary controller for processing image data from method 100 (see FIG. 1) and for controlling robot 200, shown in FIG. 2 for example. FIGS. 1, 2 and 3 are best viewed together with the following description. Controller 310 includes memory 320 for storing software 330 having machine readable instructions executed by a processor 340 and an interface 345 to enable a user to provide input and receive data. Controller 310 is for example one or more of a computer, a microcontroller, a programmable logic controller (PLC), and a programmable automation controller, coupled with control circuitry, such as one or more printed circuit boards for example.

Figure 5:
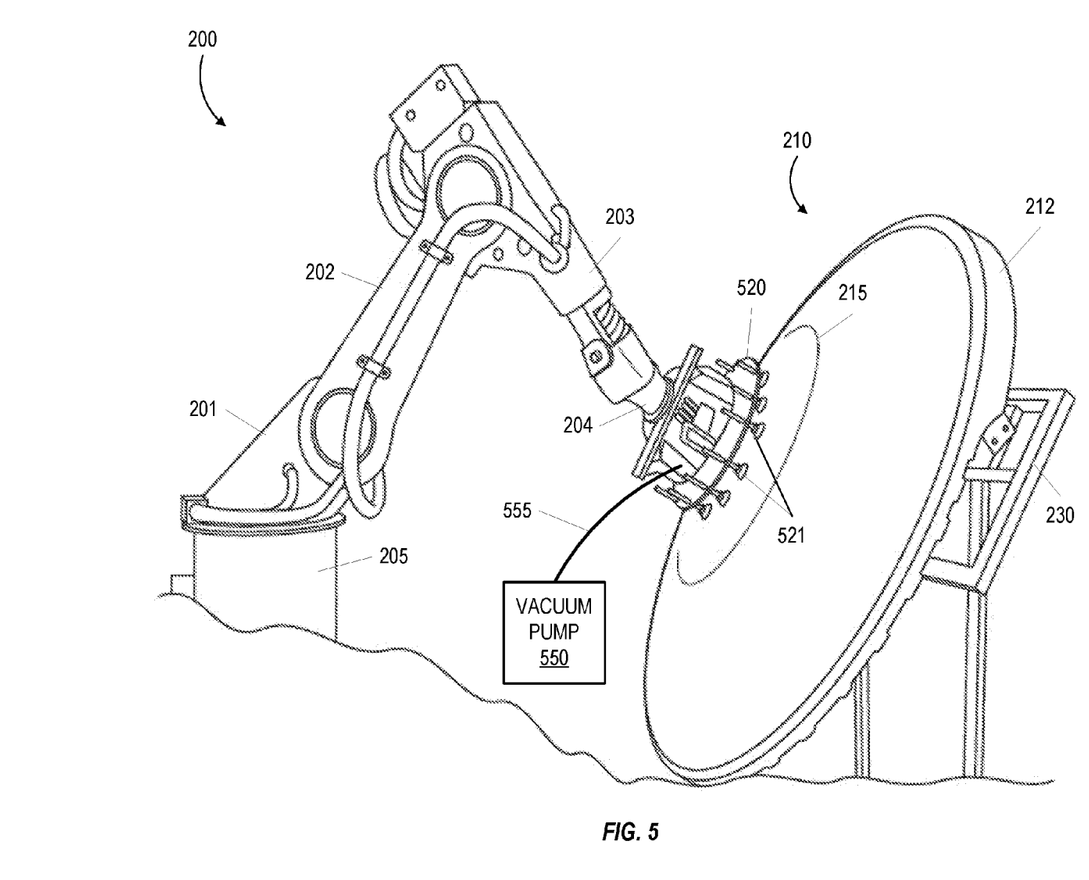
FIG. 5 depicts the robot of FIG. 2 configured with a gripper tool to perform the method of FIG. 4, in an embodiment.

Controller 310 may be coupled to robot 200, camera 240, light emitting device 245, a gripper tool 520 (see FIG. 5), a vacuum pump 550, FIG. 5, and a workstation 600 (see FIG. 6) via a two-way communication path 301, which may include one or both of a wired and/or a wireless communication media. Memory 320 in some embodiments is a memory system that includes both transitory memory such as RAM and non-transitory memory such as, ROM, EEPROM, Flash-EEPROM, magnetic media including disk drives, and optical media. Memory 320 stores software 330 as machine readable instructions executable by processor 340 to control robot 200, camera 240, light emitting device 245, gripper tool 520, vacuum pump 550, and workstation 600. Software 330 may provide instructions to process data from image data 302 of camera 240 and corresponding position information for example. Exemplary instructions may include feature position instructions 332 to provide feature position data 305, a position offset calculator 334 to provide a position offset 325, and a path offset determinator 336 to provide a path offset 337, which are further described below in conjunction with steps of method 100. A component model 315, stored in memory 320, is for example a computer-aided design (CAD) model of aircraft component 210.

Referring again to FIG. 1, in a step 130, a position offset is calculated based on differences between an actual feature position as determined from the processed image data of step 125 and an expected feature position based on a computer model of the aircraft component. In an example of step 130, a position offset 325 is calculated via a position offset calculator 334, FIG. 3 based on feature position data 305 versus the expected feature position from component model 315, FIG. 3.

In a step 135, steps 110 to 130 are repeated for a plurality of features. In an example of step 135, steps 110 to 130 are repeated for a plurality of features of aircraft component 210.

In a step 140, a path offset is determined for subsequent robotic processing steps according to the position offset calculated in step 130. Subsequent robotic processing steps include but are not limited to gripping (see e.g., FIG. 4), moving, drilling (see e.g., FIG. 7), and routing aircraft component 210, as described below. Robot 200 performs each subsequent robotic processing step by moving along a predefined path, which includes a predefined direction and speed, based on component model 315 for example. Path offset 337 updates the expected path to account for position offset 325 for features, such as feature 215, of aircraft component 210. In an example of step 140, controller 310 executes instructions for a path offset determinator 336 to determine a path offset 337 based on position offset 325 and an expected path from component model 315, FIG. 3.

In optional step 145, a quality control inspection is performed to determine if the aircraft component is manufactured according to predetermined specifications. In an example of step 145, a quality control inspection 338 analyzes one or more of path offset 337, position offset 325, and component model 315 to determine whether or not aircraft component 210 meets predetermined manufacturing specifications. If the specifications are met, aircraft component 210 may be robotically processed via subsequent steps, such as method 400, FIG. 4 and method 700, FIG. 7 for example. Otherwise, if the specifications are not met, aircraft component 210 is repaired if possible, or scrapped. Path offset 337 may still be required to account for variations of feature positions despite meeting predetermined manufacturing specifications. After performing step 145, method 100 ends.

Figure 4:
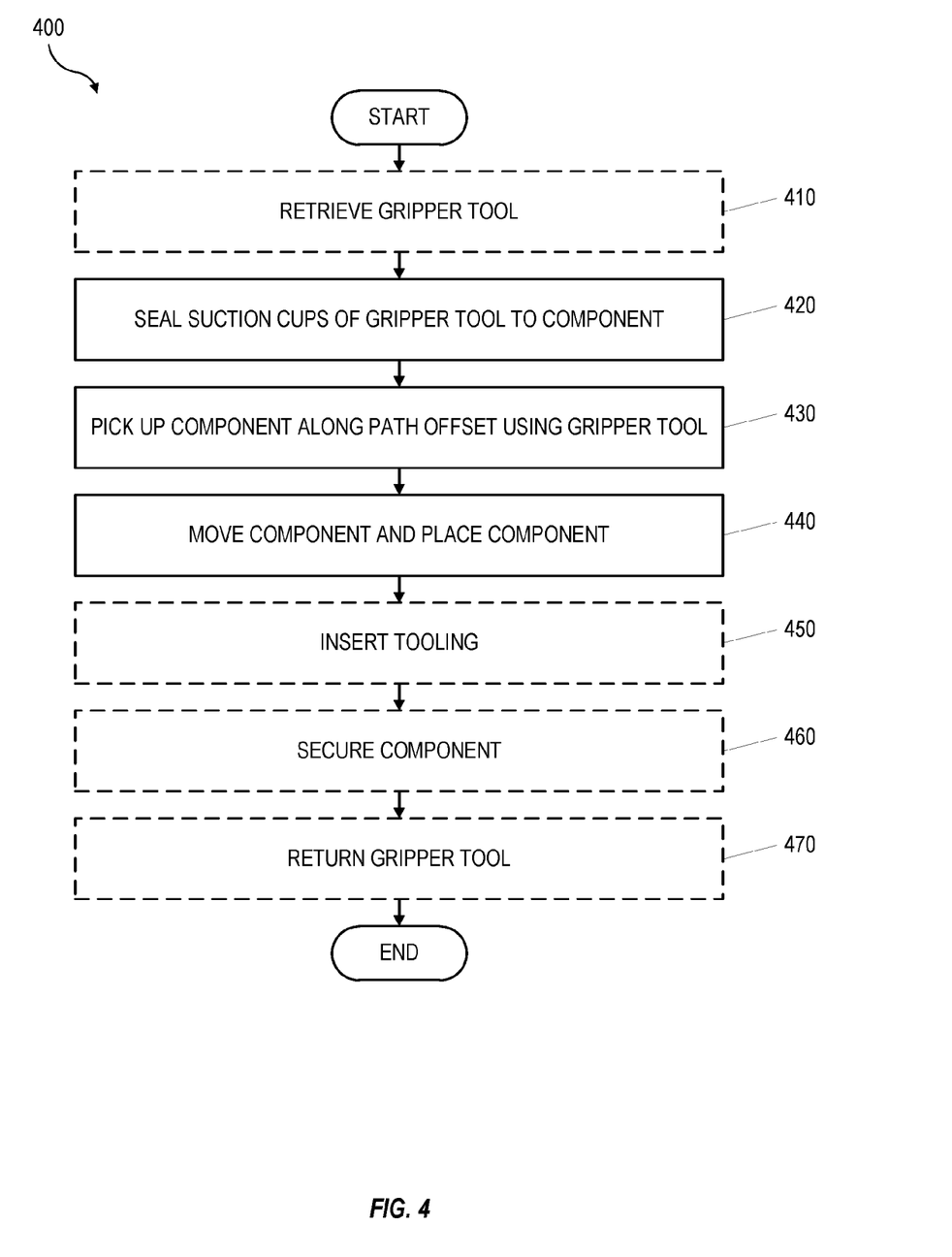
FIG. 4 shows a method for robotically gripping and moving an aircraft component, in an embodiment.

FIG. 4 shows an exemplary method 400 for robotically gripping and moving an aircraft component. Specifically, method 400 includes steps for robotically handling an aircraft component, such as aircraft component 210, FIG. 2 for example, using robot 200 configured with a gripper tool, such as gripper tool 520, FIG. 5 for example. Method 400 may be used to robotically handle other aircraft components using alternative tools without departing from the scope hereof. Method 400 further includes steps for robotically moving an aircraft component to a workstation for further processing, such as moving aircraft component 210, FIG. 2 to workstation 600, FIG. 6 using robot 200 configured with gripper tool 520 for example. The order of steps of method 400 may be rearranged so as to retrieve aircraft component 210 from workstation 600 and return it to table 230 or another location without departing from the scope hereof. Steps of method 400 are described below in conjunction with FIGS. 5 and 6.

In an optional step 410, the robot retrieves the gripper tool. In an example of step 410, robot 200 is configured to mechanically couple to gripper tool 520 via head 204, as depicted in FIG. 5. Step 410 is optional because gripper tool 520 may be previously or permanently fixed to robot 200 without departing from the scope hereof.

FIG. 5 depicts robot 200, FIG. 2 configured with gripper tool 520 to perform method 400, FIG. 4. FIGS. 4 and 5 are best viewed together with the following description. Gripper tool 520 may include a plurality of suction cups 521. Not all suction cups 521 are depicted or enumerated in FIG. 5 for clarity of illustration. Vacuum pump 550 provides vacuum pressure to suction cups 521 via one or more of tube 555. Suction cups 521 of gripper tool 520 are arranged such that each suction cup contacts a smooth portion of aircraft component 210 to provide an adequate seal therebetween while avoiding any features such as seams, overlapping layers, holes, corners, rivets, etc. that may interfere with the seal. Gripper tool 520 may be configured with a variety of suction cup arrangements for gripping a respective variety of different aircraft components. Alternatively, gripper tool 520 may be configured with adjustable suction cups 521 to arrange for gripping a variety of aircraft components. Head 204 is configured to pivot and spin about a central axis such that gripper tool 520, and by extension aircraft component 210 held by gripper tool 520, may be correspondingly pivoted and spun about a central axis.

Referring to FIG. 4, in a step 420, a plurality of suction cups are sealed to the aircraft component. In an example of step 420, suction cups 521 of gripper tool 520 are pressed against smooth portions of aircraft component 210 by robot 200 to form a seal therebetween. The smooth portions of aircraft component 210 are portions lacking surface features as determined for example in step 125, FIG. 1 described above. In an embodiment, vacuum pressure is applied to suction cups 521 via vacuum pump 550 to increase pressure with aircraft component 210. Robot 200 moves gripper tool 520 along a path that includes a path offset such as path offset 337, FIG. 3 determined for example via step 140, FIG. 1.

In a step 430, the robot picks up the component using the gripper tool. In an example of step 430, using gripper tool 520, robot 200 picks up aircraft component 210 off of, for example, table 230, FIG. 2 or workstation 600, FIG. 6 described below.

Figure 6:
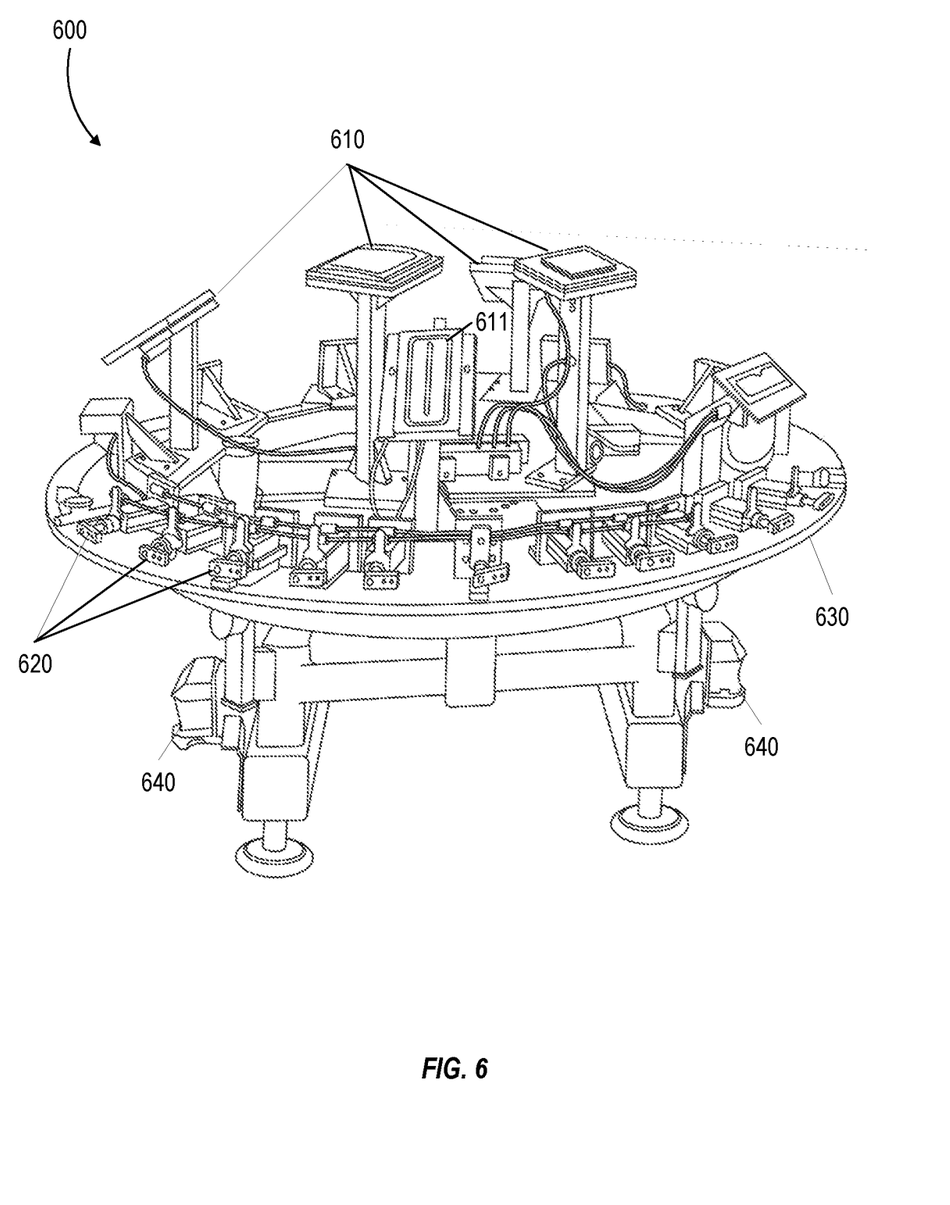
FIG. 6 shows a workstation to secure and rotate an aircraft component for robotic processing, in an embodiment.

FIG. 6 shows an exemplary workstation 600 to secure and rotate a component for robotic processing. Specifically, workstation 600 is configured for securing aircraft component 210 in place while robotically processing via method 700, FIG. 7 described below. Workstation 600 includes one or more stands 610 that support an underside of aircraft component 210, opposite feature 215. Not all stands are enumerated in FIG. 6 for clarity of illustration. Stands 610 may each include a gasket 611 for forming a seal with aircraft component 210.

Referring again to FIG. 4, in a step 440, the robot moves the aircraft component and places the aircraft component. In an example of step 440, robot 200 moves aircraft component 210 from table 230 to workstation 600. Aircraft component 210 may be placed on workstation 600 such that outer circumferential edge 212 is positioned inside arms 620. In an embodiment, aircraft component 210 is spun about its central axis via third arm 203 to a preferred orientation prior to placing on workstation 600.

Referring to FIG. 6, a plurality of arms 620 are located around the circumference of workstation 600 for gripping outer circumferential edge 212 of aircraft component 210. Not all arms 620 are depicted or enumerated in FIG. 6 for clarity of illustration. Arms 620 are used to further secure aircraft component 210 to workstation 600 in a step 460, FIG. 4 described below.

Workstation 600 includes on a rotatable base 630 which enables rotation of aircraft component 210 to rotate for processing via robot 200. By rotating aircraft component 210 via rotatable base 630, robot 200 is not required to extend to a far side of aircraft component 210. Instead, the far side is rotated into position near robot 200. In an embodiment, workstation 600 includes laser sensors 640 for sensing the presence of a user within a safe buffer area surrounding workstation 600.

Referring again to FIG. 4, in an optional step 450, a tooling is inserted into the component. In an example of step 450, an operator inserts one or more tooling pins into pre-drilled holes of aircraft component 210. The one or more tooling pins may insert into corresponding holes in stands 610 of workstation 600 for ensuring a proper orientation of aircraft component 210 on workstation 600.

In an optional step 460, the aircraft component is secured to the workstation. In an example of step 460, vacuum pressure is applied within gasket 611 to increase pressure of the seal for securing aircraft component 210 to stands 610. In another example of step 460, arms 620 may pivot counter-clockwise about ninety degrees from a generally horizontal position to a generally vertical position. Arms 620 may initially be located outside of outer circumferential edge 212 and then retracted in a radially inward direction to contact outer circumferential edge 212 and apply contact pressure thereto for further securing aircraft component to workstation 600, as depicted in FIG. 8 for example. Step 460 ensures that aircraft component 210 remains stationary during subsequent processing steps, such as method 700, FIG. 7, which may impart a force to aircraft component 210.

In an optional step 470, the robot returns the gripper tool. In an example of step 470, robot 200 returns gripper tool 220 to a storage location for subsequent use. Following step 470, method 400 ends. Step 470 is optional because gripper tool 520 may be fixed to robot 200 without departing from the scope hereof The steps of method 400 are shown in an exemplary order in FIG. 4 and may be rearranged without departing from the scope hereof. For example, steps 450 and 460 to insert tooling and secure the component, respectively, may be performed after returning the gripper tool in step 470.

In an embodiment, steps of method 400 are rearranged and used to pick up a component from a workstation and move the aircraft component to the table or other location. For example, after step 410 retrieves gripper tool 520 and step 420 seals suction cups of gripper tool 520 to aircraft component 210, step 430 may pick up aircraft component 210 from workstation 600, and step 440 places aircraft component 210 on table 230.

Figure 7:
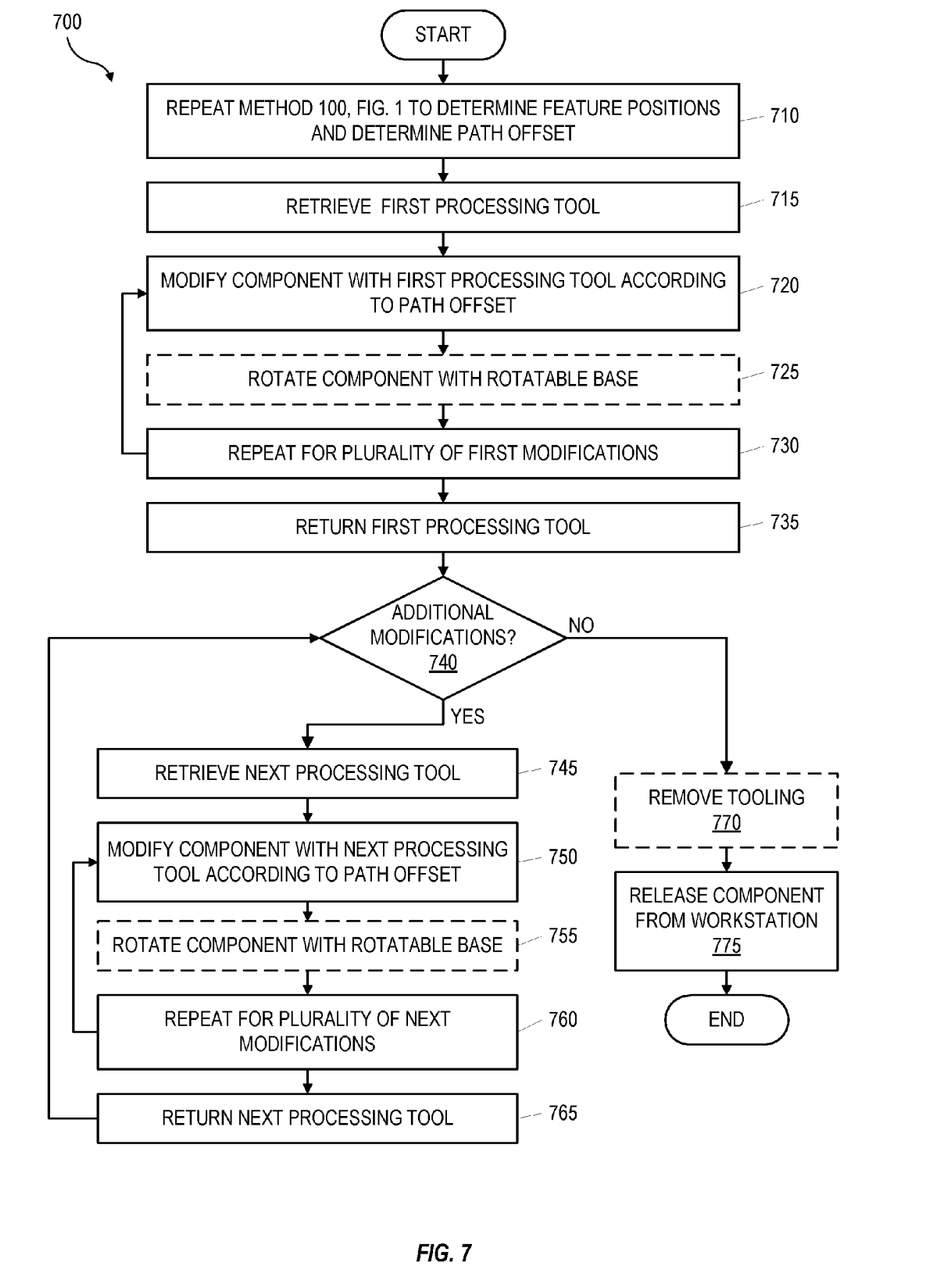
FIG. 7 shows steps of a robotic method for processing an aircraft component, in an embodiment.
Figure 8:
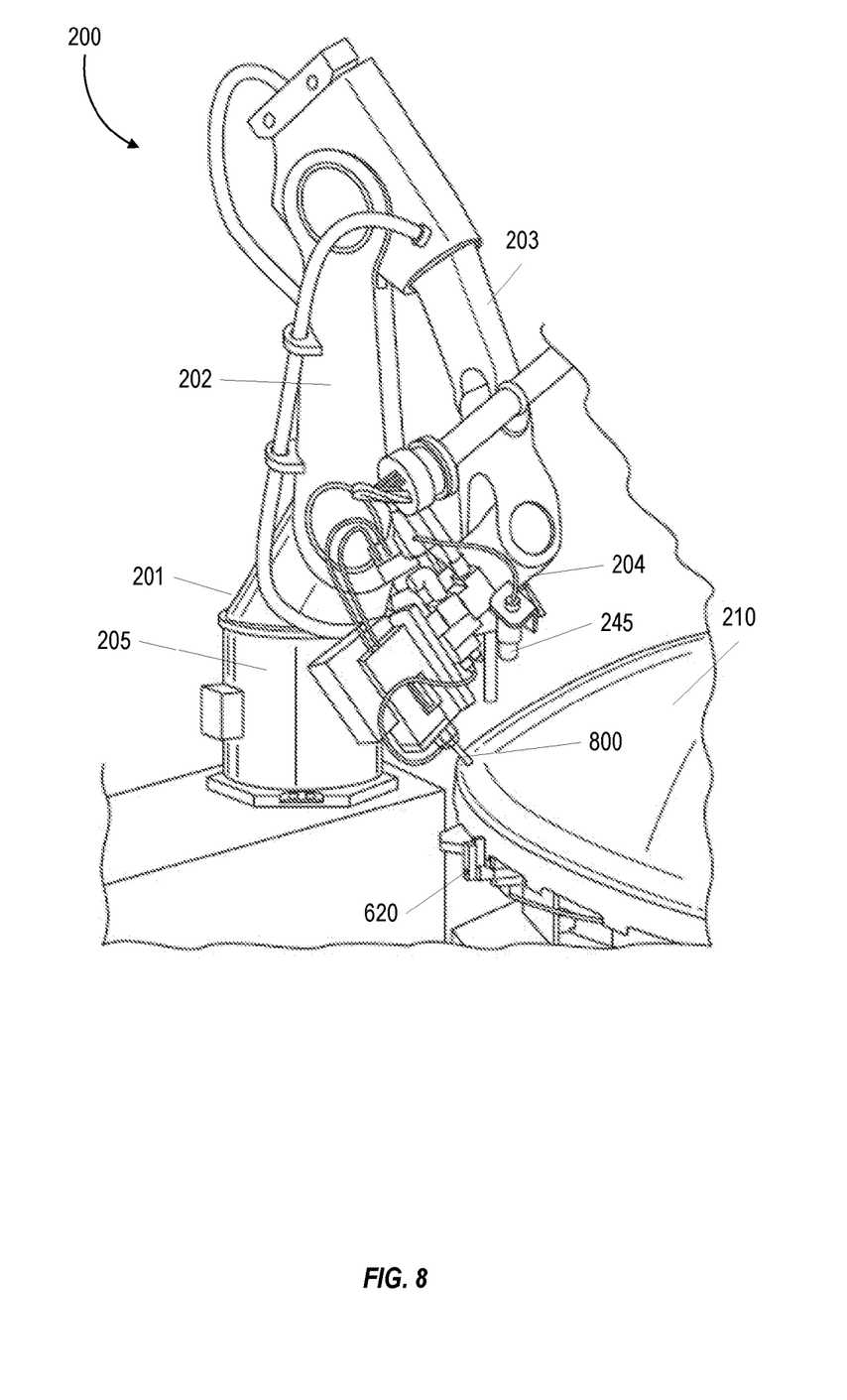
FIG. 8 shows a robot configured to perform the robotic method of FIG. 7, in an embodiment.

FIG. 7 shows steps of a robotic method 700 for processing an aircraft component. Method 700 may be performed after performing method 400 such that aircraft component 210 is secured to workstation 600 prior to performing steps 710 to 775. Steps of method 700 include modifying aircraft component 210 using one or more processing tools. Each of the one or more processing tools may be used to make one or more modifications to aircraft component 210. Exemplary processing tools include a drill and a router and exemplary modifications include radial holes and openings made using the drill and the router, respectively. Additional processing tools may be used to make additional modifications without departing from the scope hereof.

FIG. 8 shows an exemplary robot configured to perform robotic method 700. Specifically, FIG. 8 shows robot 200 configured with a first processing tool 800. In an embodiment, first processing tool 800 is a drill. In another embodiment, first processing tool is a router. FIG. 8 also depicts aircraft component 210 secured on workstation 600, FIG. 6 via one of arms 620. FIGS. 7 and 8 are best viewed together with the following description.

Referring to FIG. 7, in operation 710, steps of method 100, FIG. 1 are performed to determine feature positions of the component and to determine a path offset. In an example of operation 710, robot 200 moves camera 240 to a position for imaging feature 215 of aircraft component 210 in step 110; light emitting device 245 illuminates feature 215 with light in step 115; one or more images of feature 215 are captured via camera 240 in step 120; image data 302, FIG. 3 are processed to determine feature position data 305 in step 125; feature position data 305 are compared to component model 315 to determine position offset 325 in step 130; steps 110 to 130 are repeated for a plurality of features in step 135; and, path offset 337 is determined based on position offset 325 and component model 315.

In a step 715, the robot retrieves a first processing tool which might be, for example, a tool, like tool 800 shown in FIG. 8. In an embodiment, first processing tool 800 is a drill. Step 715 may pause upon retrieving the drill and require a user to verify a drill bit size for example.

In a step 720, the robot uses the first processing tool to modify the component according to the path offset. In an example of step 720, robot 200 uses first processing tool 800 to make a first modification in aircraft component 210 at a desired location based on path offset 337. The first modification is a first type of modification such as a radial hole of a first diameter.

In an optional step 725, the component is rotated using a rotatable base. In an example of step 725, rotatable base 630, FIG. 6 rotates aircraft component 210 to a desired orientation. Optional step 725 is optional because a plurality of modifications may be made to aircraft component 210 from a single orientation.

In step 730, additional first modifications may be made by repeating step 720 and optionally step 725. In an example of step 730, steps 720 and optionally 725 are repeated to drill a plurality of radial holes each having a first diameter.

In step 735, the first processing tool is returned. In an example of step 735, first processing tool 800 is returned to a storage location.

In step 740 a decision is made. If additional modification types are to be made, method 700 proceeds to step 745. Otherwise, method 700 proceeds to step 770. In an example of step 740, additional modifications are to be made to aircraft component 210 such as routing and method 700 proceeds to step 745 to retrieve a router.

In step 745, the robot retrieves a next processing tool. In an example of step 745, robot 200 retrieves a next processing tool different from first processing tool 800. In an embodiment, the next processing tool is a router. In another embodiment, the next processing tool is a variant of the previous processing tool. For example, first processing tool 800 may include a drill configured with a first diameter drill bit for providing radial holes of first diameter. The next processing tool may include the same drill as first processing tool 800 configured to secure a second diameter drill bit for providing radial holes of second diameter to the same aircraft component 210.

In step 750, the robot uses the next processing tool to modify the component according to the path offset. Step 750 is an example of step 720 using the next processing tool to make a next modification as opposed to using first processing tool 800 to make a first modification. In an embodiment, the next processing tool is a router and the next modification is a rout out. The rout out may be any size and shape that the router is capable of routing. Rout outs may be used for example to enable ductwork, cables, etc. to be passed through aircraft component 210.

In an optional step 755, the component is rotated using a rotatable base. Step 755 is an example of step 725.

In step 760, additional next modifications may be made by repeating step 750 and optionally step 755. Step 760 is an example of step 730.

In step 765, the next processing tool is returned. Step 765 is an example of step 735.

Following step 765, method 700 returns to step 740 to decide if additional modification types will be made.

In optional step 770, the user removes tooling from the component. In an example of step 770, the user removes tooling pins from aircraft component 210 that were inserted in step 450, FIG. 4 and verifies that the pins have been removed before method 700 proceeds.

In step 775, the component is released. In an example of step 775, arms 620 extend radially outward and rotate clockwise about 90 degrees from a substantially vertical orientation to a substantially horizontal orientation to release outer circumferential edge 212, and the vacuum applied to stands 610 is allowed to equilibrate with ambient pressure. Following step 775, aircraft component 710 may be moved using gripper tool 520 and robot 200 according to steps of method 400, described above.

FIG. 7 illustrates an exemplary order for performing steps of method 700, but the specific order of steps may be rearranged without departing from the scope hereof.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A robotic method for processing an aircraft component comprising:
    determining a position of a plurality of features of the aircraft component by illuminating the aircraft component with a laser mechanically coupled to a robot arm, imaging the reflected laser light with a camera mechanically coupled to the robot arm, and processing images from the camera;
    determining a position offset for the plurality of features by comparing the position of the plurality of features to a model of the aircraft component;
    determining a path offset for movement by the robot arm based on the position offset and the model of the aircraft component;
    retrieving a gripper tool via the robot arm, the gripper tool having a plurality of suction cups fluidly coupled to a vacuum source;
    robotically gripping the aircraft component with the gripper tool based on the position offset and the path offset by applying a vacuum to the suction cups to create a seal for securing the aircraft component;
    robotically spinning the aircraft component to a predetermined orientation using the gripper tool;
    robotically placing the aircraft component on a workstation using the gripper tool;
    securing the aircraft component using the workstation by clamping actuator arms and applying a vacuum to a plurality of stands of the workstation;
    releasing the vacuum of the gripper tool and returning the gripper tool to a storage location;
    retrieving a first processing tool with the robot arm; and
    modifying the aircraft component, based on the path offset, using the first processing tool coupled to the robot arm to make a first modification.

2. The method of claim 1, further comprising repeating the step of modifying the aircraft component using the first processing tool for a plurality of first modifications.

3. The method of claim 1, further comprising returning the first processing tool with the robot arm to a storage location.

4. The method of claim 1, further comprising retrieving a next processing tool with the robot arm.

5. The method of claim 4, further comprising modifying the aircraft component using the next processing tool based on the path offset to make a next modification.

6. The method of claim 1, wherein the laser is an infrared laser line generator configured for illuminating the feature with infrared laser light.

7. The method of claim 6, further comprising receiving the infrared laser light reflected from the feature to capture at least one infrared image using the camera configured with an infrared filter.

8. The method of claim 1, further comprising performing a quality control inspection of the aircraft component by analyzing the position offset for the plurality of features to determine whether the aircraft component meets predetermined manufacturing specifications.

9. The method of claim 1, further comprising inserting one or more tooling pins into pre-drilled holes of the aircraft component, wherein the one or more tooling pins insert into corresponding holes in the plurality of stands of the workstation for ensuring a proper orientation of the aircraft component.

10. A robotic system for processing an aircraft component, comprising:
    a light emitting device and a camera configured for respectively illuminating and receiving a plurality of images of features of the aircraft component;
    a gripper tool having a plurality of suction cups and a vacuum pump to apply vacuum pressure for gripping and moving the aircraft component based on the plurality of images received using the camera;
    a workstation for receiving the aircraft component from the gripper tool, the workstation having one or more stands that support the aircraft component and a plurality of arms that retract applying contact pressure to an outer edge of the aircraft component, wherein the one or more stands each include a gasket for forming a seal with the aircraft component to increase pressure of the seal for securing the aircraft component to the one or more stands;
    a processing tool configured for modifying the aircraft component secured to the workstation based on the plurality of images received; and
    a controller configured to robotically control the light emitting device and the camera to determine locations of the features, and to robotically control the gripper tool, the workstation, and the processing tool to make at least one modification to the aircraft component based on the locations of the features of the aircraft component.

11. The system of claim 10, wherein the workstation further comprises a rotatable base for rotating the aircraft component to a desired orientation.

12. The system of claim 10, at least of the features is an overlapping layer of the aircraft component and the light emitting device is an infrared laser light for illuminating the overlapping layer.

13. The system of claim 10, wherein the plurality of suction cups of the gripper tool are arranged such that each suction cup contacts a smooth portion of the aircraft component to provide an adequate seal therebetween while avoiding any features that may interfere with the seal.

14. The system of claim 10, wherein the gripper tool includes adjustable suction cups to arrange for gripping a variety of aircraft components.

* * * * *